US008855459B2

(12) United States Patent
Millet et al.

(10) Patent No.: US 8,855,459 B2
(45) Date of Patent: Oct. 7, 2014

(54) METHOD AND APPARATUS FOR PROLONGING BATTERY LIFE OF A MEDIA PLAYER

(75) Inventors: Timothy J. Millet, Mountain View, CA (US); Michael Culbert, Monte Sereno, CA (US); William C. Athas, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1599 days.

(21) Appl. No.: 12/140,976

(22) Filed: Jun. 17, 2008

(65) Prior Publication Data

US 2009/0313484 A1    Dec. 17, 2009

(51) Int. Cl.
*H04N 5/91* (2006.01)
*G06F 1/30* (2006.01)
*G06F 1/32* (2006.01)

(52) U.S. Cl.
CPC .............. *G06F 1/30* (2013.01); *Y02B 60/1292* (2013.01); *G06F 1/3203* (2013.01)
USPC ........................................... 386/46; 386/277

(58) Field of Classification Search
USPC .................................................. 386/46, 277
See application file for complete search history.

(56) References Cited

U.S. PATENT DOCUMENTS

| | | | | |
|---|---|---|---|---|
| 6,714,245 | B1 * | 3/2004 | Ono | 348/333.13 |
| 7,376,331 | B2 * | 5/2008 | Cheng | 386/353 |
| 2004/0218065 | A1 * | 11/2004 | Schinner | 348/231.6 |
| 2005/0213929 | A1 | 9/2005 | Cheng | |
| 2006/0013570 | A1 * | 1/2006 | Suzuki | 386/125 |
| 2006/0039469 | A1 | 2/2006 | Leibbrandt | |
| 2006/0143483 | A1 * | 6/2006 | Liebenow | 713/300 |
| 2007/0011473 | A1 * | 1/2007 | Sung | 713/300 |
| 2007/0088522 | A1 * | 4/2007 | Van Gassel | 702/127 |
| 2007/0150592 | A1 | 6/2007 | Bell | |
| 2007/0234236 | A1 | 10/2007 | Champion et al. | |
| 2008/0138046 | A1 * | 6/2008 | Nakazawa | 386/124 |

OTHER PUBLICATIONS

M.F. Lopez, S.G. Rodriguez, J.P. Ortiz, J.M. Dana, V.G. Ruiz and I. Garcia; Fully Scalable Video Coding with Packed Stream; Computer Architecture and Electronics Department, University of Almeria; Almeria, Spain.

* cited by examiner

*Primary Examiner* — Jeffrey Pwu
*Assistant Examiner* — Helai Salehi
(74) *Attorney, Agent, or Firm* — Park, Vaughan, Fleming & Dowler LLP (57) ABSTRACT

A method of operating a media player is provided. In one embodiment the method includes receiving a plurality of initially configured video settings for viewing a video segment on the media player for a desired playback duration. The method further includes determining power required to play the video segment based on the initial video settings and playing the video segment if the required power matches or is less than total power available to the media player. In another embodiment, the method may further include, if the required power exceeds the total power available to the media player, adjusting one or more of the initial video settings, either automatically or by user inputs, to reduce the power required to play the requested video segment for the desired playback duration.

23 Claims, 5 Drawing Sheets

METHOD AND APPARATUS FOR PROLONGING BATTERY LIFE OF A MEDIA PLAYER

BACKGROUND OF THE INVENTION

1. Field of the Invention

The present invention relates generally to media players and, more particularly, to techniques for extending the battery life of such media players.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Portable video devices, such as laptops, portable DVD players, portable digital cameras, hand-held devices, cellular phones and so forth, are adapted to provide users a variety of digital video capabilities. Particularly, such capabilities may include providing users with streaming video, for example, as may occur when a user is on-the-go, traveling or is otherwise away from a home or office desktop computer, DVD player, and the like.

For example, a user may wish to use their portable media player, such as a portable DVD player, to watch a video segment while en-route to a destination, as may typically occur by commuters traveling in commercial airlines, trains and so forth. In doing so, however, the user may be unaware when the media player lacks sufficient power for playing the video segment as desired. For instance, the duration of the video segment, as well as video settings, such as picture resolution, video bit-rate, display backlight intensity, sound volume, etc., to which the media player is initially configured, may demand an amount of electrical power exceeding that which a battery of the media player is able to provide. Thus, while the user may be able to begin viewing the selected video segment, the viewing of the video segment may abruptly end when the media player runs out of power unexpectedly during playback of the video segment.

Furthermore, even if the user may suspect that the media player may not have sufficient power for playing the entire video segment, the user may not have an ability to determine in what manner to adjust the device's settings so that the desired video segment can be played in entirety at an acceptable level of viewing quality.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

The present disclosure relates to techniques for operating a media player. In accordance with one disclosed embodiment, an intelligent power management method for operating a media player may include determining the amount of power required to view a video segment either in its entirety or for a specified playback duration on a media player using a set of video settings. By way of example, such video settings may include playing time, display resolution, video bit-rates, backlight intensity levels, sound volume levels, and so forth. The video settings may be initially configured by a manufacturer or later configured by a user. As used herein, the term "video setting(s)" or the like shall be understood to include both video settings initially configured by a manufacturer (e.g., unchanged by a user), as well as video settings later configured and/or modified by a user (e.g., altered from the initial manufacturer settings).

In accordance with one embodiment, a "priority ranking" attribute may be assigned to each of the aforesaid video settings. These ranking attributes may be initially set by a manufacturer or specified by a user, and may be used to provide ranking information regarding the importance of each video setting to a user. For instance, a video setting having a high ranking may correspond to a setting having a high level of aesthetic importance to a user viewing a video segment. Similarly, a video setting having a low ranking may correspond to a setting that a user may not consider as aesthetically important when viewing the video. As used herein, the term "ranking attribute(s)," "ranking(s)," or the like shall be understood to include both rankings initially configured by a manufacturer, as well as rankings later specified or modified by a user.

Next, the method may include making a determination as to the amount of power required to play the video segment based on the video settings. The method may further include comparing the required power to the total power available to the media player and playing the video segment using the video settings if the required power matches or is less than the total power available to the media player. If sufficient power is not available, the method may include automatically adjusting the video settings in accordance with the aforementioned ranking attributes so as to lower overall power consumption to a level enabling playback of the video segment in either its entirety or, in certain embodiments, for a specified playback duration.

By way of example, the method may include first adjusting the video setting having the lowest ranking to a level in order to reduce to power required to play the entirety of the video segment. In one embodiment, each of the video settings discussed above may be further associated with a minimum playback threshold. Thus, the method may include lowering the lowest ranking video setting to its respective minimum playback threshold level. Thereafter, if the power required to play back the video segment using the adjusted video settings still exceeds the total available power, the method may continue to adjust additional video settings in a similar manner based on each video settings' respective ranking attribute and minimum playback threshold with the goal of reaching a set of adjusted video settings that will enable the media player to play the video segment in its entirety.

If, after adjusting each of the video settings in accordance with the aforementioned ranking attributes and minimum playback thresholds, the method determines that the required power still exceeds the total available power, the method may include notifying the user that the amount of power available to the device is insufficient for playing the video segment in accordance with either the initial video settings configuration or the adjusted video settings configuration. In this situation, the method may further include enabling the user to further adjust the video settings so that the video segment may be viewed in its entirety. By way of example, the method may include allowing the user to further manually adjust one or more of the video settings below a minimum playback threshold. Alternatively, the method may include providing the user with one or more suggested alternative video settings configurations that would allow the complete play back of the video segment.

In accordance with a further embodiment of the present invention, a media player may include an intelligent power management system adapted to carry out the above-described method. The intelligent power management system may include a processing device and a storage device, which may be provided by any of one or more suitable computer-readable medium. The processing device may be adapted to execute instructions stored on a computer-readable medium for controlling the viewing of video files in accordance with the above-described intelligent power management method.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present invention without limitation to the claimed subject matter.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
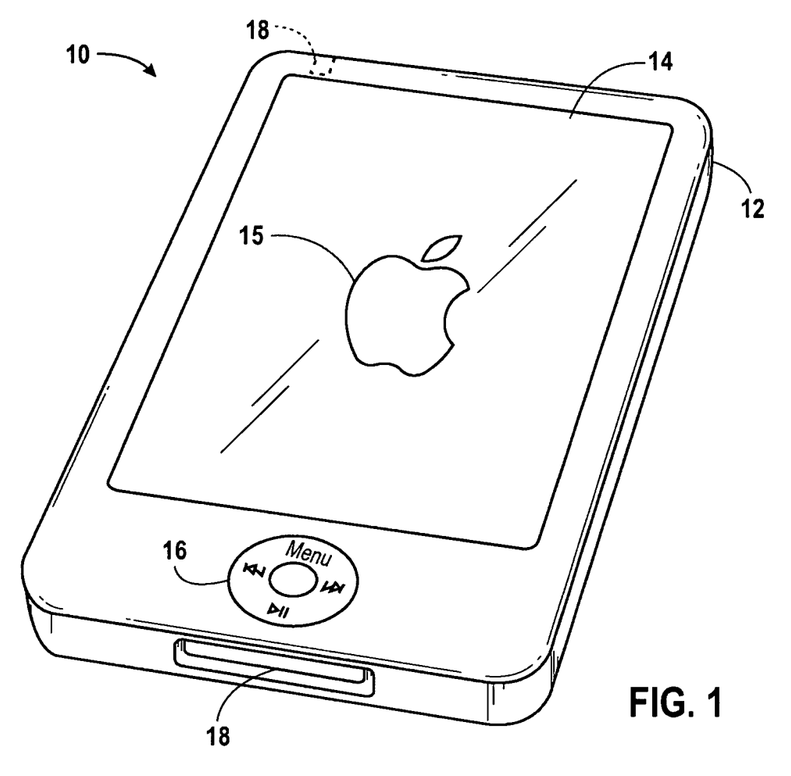
FIG. 1 is a perspective view illustrating a portable media player in accordance with an embodiment of the present invention.

An exemplary electronic device 10 is illustrated in FIG. 1 in accordance with one embodiment of the present invention. In some embodiments, including the presently illustrated embodiment, the device 10 may be a portable electronic device, such as a media player, a cellular phone, a lap top, a personal data organizer, or the like. Indeed, in such embodiments, a portable electronic device may include a combination of the functionalities of such devices.

In addition, the electronic device 10 may allow a user to connect to and communicate through the Internet or through other networks, such as local or wide area networks. For example, the portable electronic device 10 may allow a user to access the Internet and to communicate using e-mail, text messaging, instant messaging, or using other forms of electronic communication. By way of example, the electronic device 10 may be a model of an iPod having a display screen or an iPhone available from Apple Inc.

In certain embodiments, the device 10 may be powered by one or more rechargeable and/or replaceable batteries. Such embodiments may be highly portable, allowing a user to carry the electronic device 10 while traveling, working, exercising, and so forth. In this manner, and depending on the functionalities provided by the electronic device 10, a user may listen to music, play games or video, record video or take pictures, place and receive telephone calls, communicate with other users or devices, control other devices (e.g., via remote control and/or Bluetooth functionality), and so forth while moving freely with the device 10. In certain embodiments, the device 10 may be sized such that it fits relatively easily into a pocket or a hand of the user.

As will be discussed further below, the device 10 may be adapted to execute the above-mentioned user-desired functionalities, such as the aforementioned video, music, games, etc., by optimally allocating electrical power available to the battery among various components of the device 10. In exemplary embodiments, the device 10 may optimally configure power consuming elements associated with video playback and disposed within the device 10 in order to reduce the amount of electrical power consumed by these components during their operation (e.g., during viewing/playback of video data). Accordingly, such reduction of power consumption prolongs battery lifetime of the device 10, thus enabling the user to operate the device 10 for durations longer than would be normally expected.

For example, in one exemplary embodiment, the device 10 may respond to a user's request for watching a video segment by automatically determining whether an incompatibility exists between the power available to the device 10 and the power required to play the requested video segment. The device 10 may further automatically adjust one or more video settings, such as display resolution levels, video bit-rates, backlight intensity levels, sound volume levels and so forth, for lowering the overall power consumption, thereby enabling longer viewing times. Still in other embodiments, the device 10 notifies the user if there is insufficient power for playing a desired video segment and may further prompt the user to configure the video settings accordingly to enable the playing of the requested video segment on the device 10.

As will be discussed in further detail below, each of the video settings may be associated with a ranking attribute and/or a minimum playback level, whereby the adjustment of the video settings by the device 10 may be performed in accordance with their respective ranking attributes and minimum playback levels. Additionally, it should be noted that while certain embodiments of the present invention are described with respect to a portable electronic device, it should be appreciated that the presently disclosed techniques may be applicable to a wide array of other, less portable, electronic devices and systems that are configured to render video data, such as a desktop computer, a DVD player, or a similar device.

In the presently illustrated embodiment, the device 10 includes an enclosure or housing 12, a display 14, user input structures 16, and input/output connectors 18. The enclosure 12 may be formed from plastic, metal, composite materials, or other suitable materials, or any combination thereof. The enclosure 12 may protect the interior components of the electronic device 10 from physical damage, and may also shield the interior components from electromagnetic interference (EMI).

The display 14 may be a liquid crystal display (LCD), a light emitting diode (LED) based display, an organic light emitting diode (OLED) based display, or some other suitable display. In accordance with certain embodiments of the present invention, the display 14 may display a graphical user interface and various other images, such as logos, avatars, photos, album art, and the like. The display 14 may also be adapted to allow a user play and view video files on the device 10. Additionally, in one embodiment, the display 14 may include a touch screen through which a user may interact with the graphical user interface. The display may also include various function and/or system indicators to provide feedback to a user, such as power status, call status, memory status, or the like. These indicators may be incorporated into the user interface displayed on the display 14.

In one embodiment, one or more of the user input structures 16 may be configured to control the device 10, such as by controlling a mode of operation, an output level, an output type, and so forth. For instance, the user input structures 16 may include a button to power the device 10 on or off. Further the user input structures 16 may allow a user to interact with the graphical user interface on the display 14. Embodiments of the portable electronic device 10 may include any number of user input structures 16, including buttons, switches, a control pad, a scroll wheel, or any other suitable input structures. The user input structures 16 may work with the graphical user interface displayed on the device 10 to control functions of the device 10 and/or any interfaces or devices connected to or used by the device 10. For example, the user input structures 16 may allow a user to navigate a displayed graphical user interface or to return such a displayed graphical user interface to a default or home screen.

The device 10 may further include various input and output ports 18 to allow for the connection of additional devices. For example, a port 18 may be a headphone jack that provides for the connection of headphones. Additionally, a port 18 may have both input/output capabilities to provide for connection of a headset (e.g., a headphone and microphone combination). Embodiments of the present invention may include any number of input and/or output ports, such as headphone and headset jacks, universal serial bus (USB) ports, IEEE-1394 ports, and AC and/or DC power connectors. Further, the device 10 may use the input and output ports to connect to and send or receive data with any other device, such as other portable electronic devices, personal computers, printers, or the like. For instance, in one embodiment, the device 10 may be capable of connecting to a personal computer via a USB connection to send and receive data files, such as media files.

Figure 2:
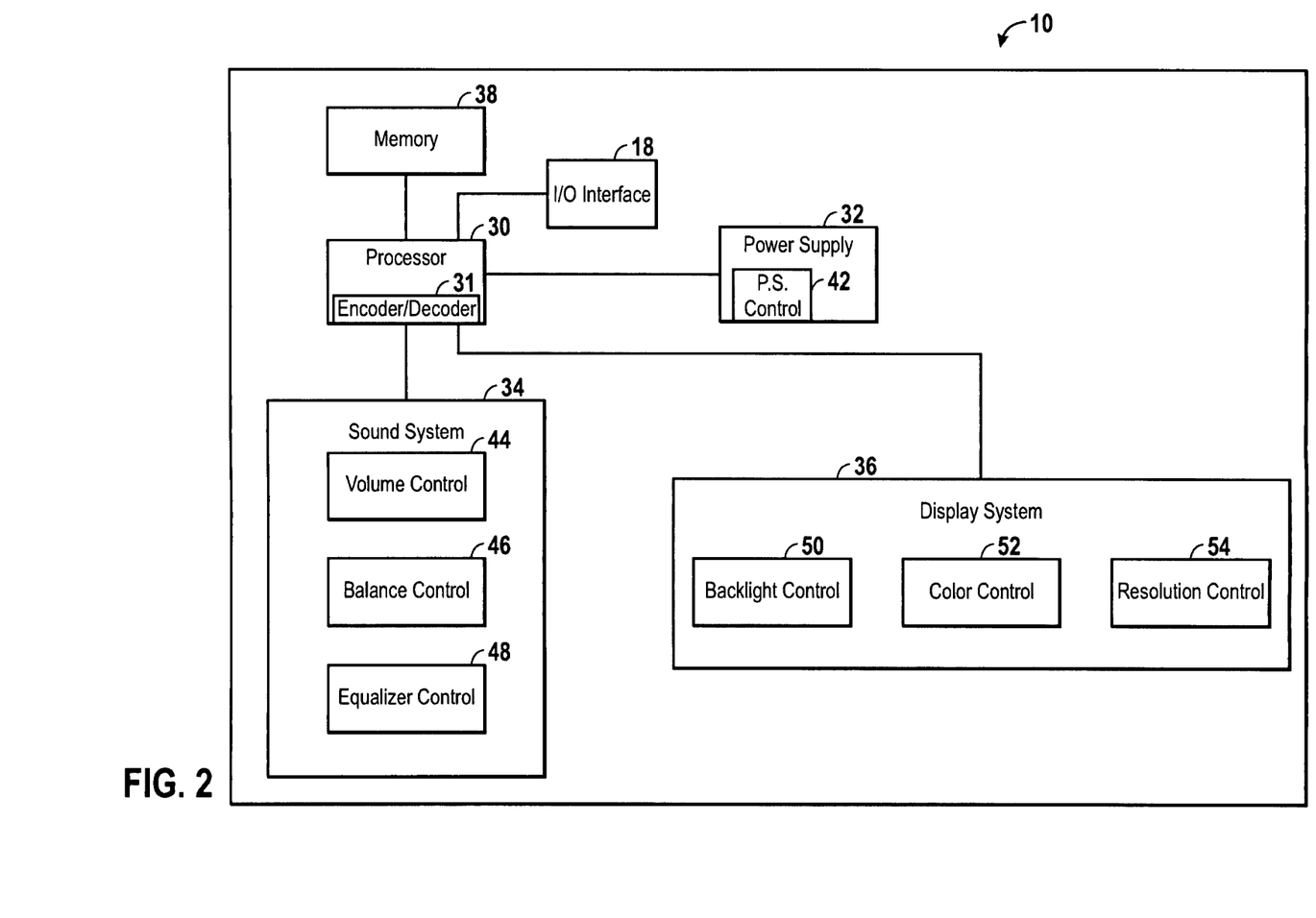
FIG. 2 is a block diagram of the portable media player of FIG. 1 in accordance with an embodiment of the present invention.

Additional details of the illustrative device 10 may be better understood through reference to FIG. 2, which is a block diagram illustrating various internal components and features of the device 10 in accordance with one embodiment of the present invention. In the presently illustrated embodiment, the device 10 may include one or more processors 30 including an encoder/decoder 31, a power supply 32, sound system 34 and display system 36. The device 10 may further include a memory device 38 and the above-mentioned I/O port 18. The memory device 38 may include a magnetic memory device, an optical memory device, a flash memory device, or a combination thereof, for example.

As further shown in the presently illustrated embodiment, the power supply 32 includes a power supply control 42. The power supply 32 may include one or more rechargeable or reusable batteries, as discussed above. Similarly, the sound system 34 includes a volume control 44, a balance control 46 and an equalizer control 48. By the same token, the display system 36 includes a backlight control 50, a color control 52 and a resolution control 54. As further illustrated, the processor 30 of the device 10 may be adapted to control the encoder/decoder 31 and the aforementioned sound and display subsystems 34 and 36, respectively. Accordingly, the processor 30 is coupled to the power supply 32, the sound system 34, and to the display system 36. The processor 30 is further coupled to the memory 38 and to the I/O interface 18. The processor 30 may include one or more microprocessors, such as one or more "general-purpose" microprocessors, one or more special-purpose microprocessors and/or ASICS, or some combination thereof. For example, the processor 30 may include one or more reduced instruction set (RISC) processors, as well as graphics processors, video processors, and/or related chip sets. The processor 30 may further include field programmable gate arrays (FPGAs) for executing simplified and/or custom-specified logic functions and the like. Thus, the processor 30 may be adapted to provide processing capabilities required to execute and implement operating system platforms, programs, algorithms, and any other functions of the device 10.

Among its various functionalities, the processor 30 may be adapted to execute an intelligent power manager adapted to distribute power available the battery 32 between various components of the device 10, such as the encoder/decoder 31 and the sound and display system 34 and 36, respectively. As described above, the aforementioned controls (e.g., backlight 50, color 52, resolution 54, sound 34, etc.) may collectively constitute a plurality of video playback settings which may be either initially configured by a manufacturer or specified by a user.

By way of example, given the range of control settings from 0 to 10 and (LOW, MED, and HIGH), with the understanding that a setting of "10" or "HIGH" consumes the most power, while a setting of "0" or "LOW" consumes the least power, the video settings for a device 10 may be initially configured as follows:

BACKLIGHT LEVEL: 10
VOLUME LEVEL: 7
VIDEO BIT-RATE: MED
VIDEO RESOLUTION: HIGH

These video settings may represent a desired configuration set by a user by which the device 10 may use as a "default" configuration for the playback of video files or data. As can be appreciated, playing a video segment on the device 10 in its entirety using these video settings requires a certain amount of power. Thus, if the intelligent power manager determines that the total power available to the device 10 is sufficient for playing the video segment using the above video settings, the user may then proceed to view the selected video segment on the device 10 (e.g., on the display 14) based on the desired settings. If, however, the required power exceeds the total power available to the device 10, the intelligent power manager (e.g., executed by the processor 30) may automatically adjust one or more of the video settings in order to reach a configuration by which the device 10 is capable of playing the video segment in its entirety.

In certain embodiments, the adjustment of video settings may be based on a ranking attribute associated with each video setting. As described above, the ranking attribute may correspond to the aesthetic importance of a particular video setting to a user when viewing a video segment on the device 10. For instance, if the user typically uses the device 10 for viewing music videos, then the user may set a ranking attribute for the sound volume 44, balance 46, and equalizer 48 control settings as being higher than those ranking attributes relating to video/picture quality (e.g., bit-rate, resolution, color, backlight, etc.). Similarly, if a user typically uses the device 10 to watch movies or films with intense action sequences, then the user may set the ranking attributes relating to the display backlight 50, color 52, and resolution 54 control settings higher than those relating to sound quality.

In a further embodiment, each of the video settings discussed above, in addition to having a ranking attribute, may be further associated with a minimum playback threshold. As described above, the minimum playback threshold represents a lowest setting tolerable by a user with regard to a particular video setting. By way of example, a user may set a minimum playback threshold level for the video resolution control to "MED." Thus, regardless of the ranking attribute associated with the video resolution control setting, the intelligent power management routine will not adjust the video resolution setting to below the "MED" setting without first either notifying or requesting authorization from the user. Before continuing with the discussion of the intelligent power manager, it should be noted that the above-described systems and controls are provided herein by way of example, and that other embodiments of the device 10 may include additional systems, controls, and settings, which may be utilized in accordance with the techniques described herein.

In executing the intelligent power manager, the processor 30 may access and control various operational modes of the aforementioned control systems in accordance with the video settings and user rankings so as to efficiently utilize and manage the power available to the device 10 during operation. As discussed above, when the required power exceeds to total power available to the device 10, the intelligent power management (e.g., executed by the processor 30) may automatically adjust one or more of the video settings in accordance with the above-described ranking attributes and minimum playback thresholds in order to lower the power required to play an entire video segment. For instance, after adjusting (e.g., lowering) the lowest ranked video setting to its respective minimum playback threshold, the intelligent power manager may determine whether the total power available to the device 10 is sufficient for viewing the video segment based on the adjusted video settings. Thereafter, if the power required to play back the video segment using the adjusted video settings (e.g., having the lowest ranked video setting adjusted) still exceeds the total available power, the intelligent power manager may continue to adjust additional video settings in a similar manner based on each video settings' respective ranking attribute and minimum playback threshold with the goal of reaching a set of adjusted video settings that will enable the media player to play the video segment in its entirety. Thus, even though the adjusted video settings may not necessarily match the user's desired video settings, the automatic adjustment of the video settings advantageously permits a user to view the video segment in its entirety or for a playback duration specified by the user, without the video segment terminating prematurely due to insufficient power.

Further, if after adjusting each of the video settings in accordance with the aforementioned ranking attributes and minimum playback thresholds, the intelligent power manager determines that the required power still exceeds the total available power, a message notifying the user that the amount of power available to the device 10 is insufficient for playing the video segment in accordance with either the initial video settings configuration or the adjusted video settings configuration may be displayed on the display 14 of the device 10. In this situation, the user may be prompted to further adjust the video settings so that the video segment may be viewed in its entirety. For instance, the user may manually adjust one or more of the video settings below its respective minimum playback threshold to further lower the power required to view the video segment in its entirety. Alternatively, the intelligent power manager may provide the user with one or more suggested alternative video settings configurations that would allow the complete playback of the video segment. These features will be described in further detail below.

The following paragraphs are intended to provide examples with regard to the adjustment of various video settings by the intelligent power manager. Indeed, the adjustment of video settings described in the following scenarios are merely provided by way of example and should not be construed as limiting the scope of the present invention in this regard.

In one embodiment, the video segment may include scalable video data and the processor 30 may control various modes of operation of the decoder 31 for decoding the scalable video data. For example, in response to a user's request for viewing a desired video segment, the decoder 31 may be adapted to decode only certain portions of scalable video data in a manner overall reducing power consumed by the device 10. While this may sacrifice viewing quality somewhat, the user may still view selected video segments in entirety.

More particularly, the encoder/decoder 31 may be adapted to encode/decode scalable video data utilizing, for example, temporal, spatial and quality scalability techniques. For instance, in one operational mode, the decoder 31 may be adapted to decode video data by executing temporal scalability methods. In doing so, the decoder 31 may lower rates at which bits of the video data (e.g., bit-rate) are decoded in a manner that lowers image motion, however, not to an extent objectionable to the viewer. By lowering the bit-rate, the overall power consumed by the device 10 may be reduced, thereby prolonging the lifetime of the battery 32 and prolonging the user's viewing time.

By further example, the decoder 31 may be adapted to decode video data by applying quality scalability techniques, whereby hierarchal portions of the scalable video data are decoded for varying the rates at which the video data is decoded. As will be appreciated by those skilled in the art, the application of quality scalability methods typically requires organizing the video data into a hierarchy of encoded video streams. Generally, this hierarchy includes a base stream, providing a base quality level, and additional substreams that incrementally increase the quality of the video stream. In other words, by virtue of scaling the encoded video with additional substreams, a higher decoding bit-rate is required, thereby producing video images having higher quality than those decoded with a lower number of substreams (e.g., lower bit-rate). Accordingly, the above quality scalability method may also be applied by the decoder 31 for lowering the decoding bit-rate to an extent preserving acceptable viewing quality while reducing the overall power consumed by the device 10 during video playback.

While the processor 30 may implement any of the above video scaling techniques for prolonging the lifetime of the battery 32 of the device 10, the processor 30 may also control additional video settings, such as display backlight intensity levels, speaker volume levels, and so forth, as discussed above, to yet further reduce the power consumed by the device 10. For example, in response to the user's request for viewing a desired video segment, the processor 30 may access the backlight control 50 to determine whether sufficient power is available to the device to power backlight display as initially configured. Similarly, the processor 30 may access the color control 52 to further determine the power needed for powering color controlling and enhancing components of the display system 36 in accordance with desired settings throughout the duration of the selected video segment.

By further example, the processor 30, may access the sound system 34 and, particularly, the control systems 44-48. For instance, the processor 30 may access the volume control 44 for determining volume levels to which audio devices of the device 10 are initially set. This further enables the processor 30 to gauge an amount of power expected to be consumed by the audio devices of the device 10. The volume control 44 may also provide indication as to whether the user earphones or speakers are in use, which would further relax or impose constraints on operating power consumption relating to sound. As further illustrated, the processor 30 may access the speaker balance control 46 and the equalizer control 48 for determining additional sound quality settings. Thus, for example, the processor 30 may determine the manner in which to allocate power between the earphones, speakers and the like. In addition, the processor 30 may determine power usage constraints dictated by sound enhancing features and settings such as bass levels, treble levels, tone frequencies, digital equalizer effects, etc. Those skilled in the art will appreciate that the above list of control parameters surveyed by the processor 30 for determining power requirements is not exhaustive and that other power-consuming devices and/or control systems coupled to or contained within the device 10 may be accessed by the processor 30 for gauging power requirements in manners similar to those described above.

Thus, by accessing the above-mentioned subsystems, i.e., the sound system 34, display system 36 and so forth, the processor 30 may tally the total amount of power that these systems, as initially configured, will consume for the duration of the video segment, such as a movie. In evaluating the amount of power required to play a video segment, the processor 30 may take into consideration video file characteristics, such as the size of the video file, default video resolution levels and bit-rates, the duration of the selected video segment, and so forth. Accordingly, such parameters provide a correlation between the selected video segment and the amount of power the media player 10 is expected to consume while playing the selected segment. For example, by assessing the size of the video file and its playing duration, the processor 30 may determine the amount of power that would be consumed by each component of the media player 10 in order to provide a forecast as to the total amount of power that would be required by the device 10 in playing the desired video segment using the desired video settings.

After the total amount of required power is determined, the processor 30 accesses the power supply control 42 to gauge the amount of power available to the battery supply 32 for powering the device 10. Accordingly, if the available power within the power supply 32 exceeds or is equal to the power required to operate the above systems as initially configured for the entire duration of the video segment, then the video segment may be played back to the user in accordance with those initial video settings configurations. However, if power levels within the power supply 32 are insufficient for satisfying the above initial video configurations, the processor 30 or the user may take further action to configure the device 10 otherwise so as to comply with the power output capability available to the battery 32 in order to play back the entirety of the video segment.

For instance, if the selected video segment has a default playing time greater than that available to the media player 10 for playing the segment as desired, the processor 30 may automatically access and adjust one or more of the video settings, as discussed above. For example, the sound system controls 34 controls (volume 44, balance 46, equalizer 48), display system controls 36 (backlight 50, color 52, resolution 54), as well as the amount of the number of scalable video streams/substreams decoded by the encoder/decoder 31 may be adjusted in order to lower the overall power consumption. As described, each video setting may be adjusted in accordance with a ranking attribute and/or minimum playback threshold level. For instance, after adjusting (e.g., lowering) the lowest ranked video setting to its respective minimum playback threshold, the intelligent power manager may determine whether the total power available to the device 10 is sufficient for viewing the video segment based on the adjusted video settings. Thereafter, if the power required to play back the video segment using the adjusted video settings still exceeds the total power available to the device 10, the intelligent power manager may continue to adjust additional video settings in a similar manner based on each video settings' respective ranking attribute and minimum playback threshold, as discussed above, with the goal of reaching a set of adjusted video settings that will enable the media player to play the video segment in its entirety.

In an alternate embodiment, rather than utilizing a ranking attribute for each of the video settings, the intelligent power manager may offer the user several alternate video setting options from which the user can select to view the desired video segment for the entire duration (e.g., displayed on the display 14). For example, one video setting option offered to the user for viewing the desired video segment may include a resolution level set to LOW, a backlighting level set to magnitude 7 (out of 10) and sound volume level set to 5 (out of 10). A second video setting option offered to the user may include a resolution level set to HIGH, a backlighting level set to magnitude 4 and a sound volume level set magnitude 3. Accordingly, the user may select one of the alternate video settings options and proceed to view the entire video segment using those video settings.

In another exemplary embodiment, the device 10 may notify the user if the power required to play the entire video segment using the desired video settings exceeds the total power available to the device 10 and, thereafter, prompt the user to manually adjust one or more of the video settings in order to lower the power required to play the entire video segment. By way of example, the user may choose to lower video picture quality by invoking any of the above video scalability techniques for lowering the video bit-rate (e.g., decoding fewer substreams). Thus, instead of decoding the full hierarchy of the scalable video substreams, the processor 30 may decode a subset of the scalable video substreams, as implemented by the above-discussed quality scalability technique. While such a video setting adjustment may prolong the available viewing time (e.g., from 30 to 40 minutes), the media player may prompt the user through multiple adjustment iterations until the video settings of the device 10 are set at levels allowing a full playing (e.g., 45 minutes) of the selected video segment. For example, the user may adjust the backlight control 50 so as to dim the backlight of the display during the duration of the video segment. This, too, contributes to lowering the overall power consumed by the device 10 and, consequently, lengthens the viewing time of the video segment. The user may apply similar adjustments to video settings related to the sound control systems 44-48, generally associated with the sound system 34. In this manner, the user may go through several iterations of configuring the various video settings until the intelligent power manager can optimally budget the amount of power available to the power supply 32 among the various systems of the device 10 such that the playing time matches or exceeds the duration of the video segment (e.g., 45 minutes).

Alternatively, the user may also elect not to adjust the video settings, but to proceed with viewing the video segment using the current desired settings. In this scenario, the media player 10 may play the video segment using the desired settings, but due to the power deficiency, may only allow the user to view a portion (e.g., 30 minutes) of the duration of the video segment (e.g., 45 minutes).

Figure 3:
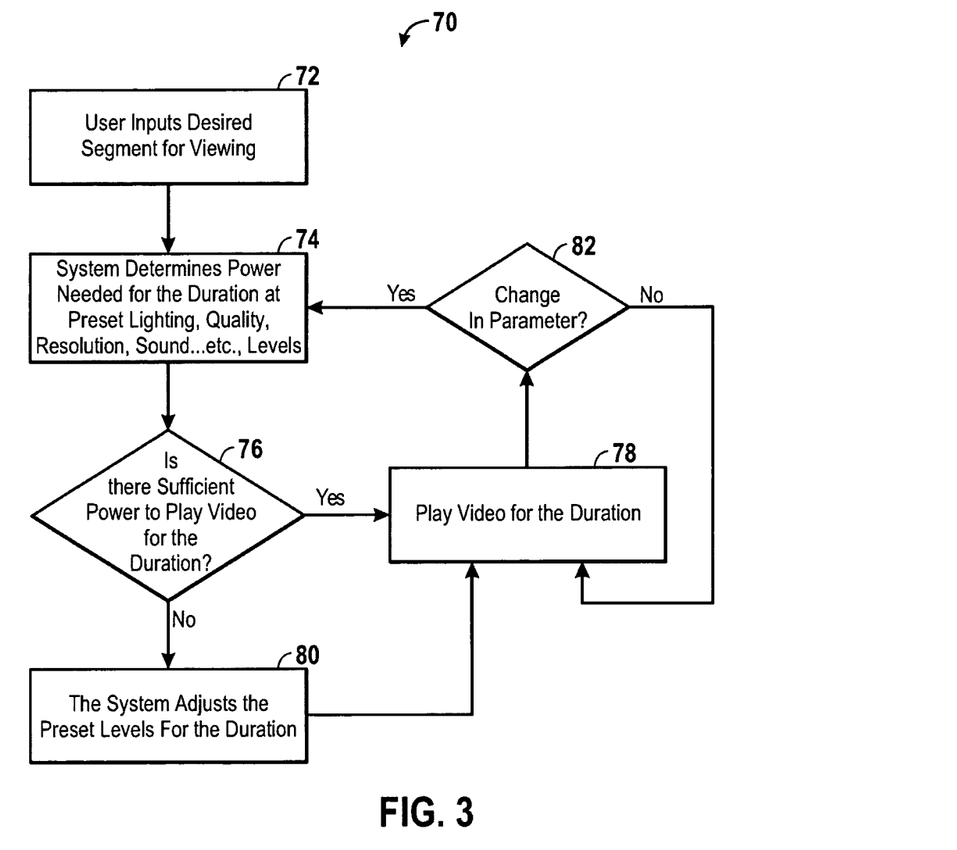
FIG. 3 is a flowchart illustrating a method for operating the media player shown in FIGS. 1 and 2 in accordance with an embodiment of the present technique.

Continuing now to FIG. 3, a flowchart illustrating an exemplary method 70 for operating the media player 10 is depicted in accordance with an embodiment of the present technique. The illustrated method 70 includes a series of steps that may be executed by a media player 10 (e.g., via processor 30). Accordingly, the method 70 may be implemented in response to a user's request for operating the device 10. Particularly, the method 70 may be implemented such that a mobile media player 10 may efficiently utilize and allocate power among its operating components. In this manner, the method 70 is adapted to prolong the battery lifetime of the media player 10, thus enabling the user to view video segments, such as movies, in their entirety with no unexpected or abrupt interruptions, such as those occurring due to insufficient power.

The method 70 begins at block 72, whereby the user enters a request into the media player (device 10), for watching a desired video segment having a specified duration. It should be appreciated that in some embodiments, the device 10 may automatically determine the total viewing time based on the size of data files corresponding to the selected video segment. Still, in further embodiments, the user may have an option of separately entering and/or specifying desired viewing times for watching portion(s) of the video segment. For instance, although a video file may require two hours to play in its entirety, a user may specify a desired playback duration that would play only the first hour of the video file, for example.

The method 70 then proceeds to block 74, whereby the media player determines the expected electrical power required to play the video segment, as initially requested by the user at block 72. As described above, this determination may be based upon video settings to which the device is initially configured, which may include viewing durations, video bit-rates, resolution settings, display backlight intensities, color enhancement settings, sound volume levels etc, and additional settings, such as those associated with the sound system 34 and display system 36 (FIG. 2).

Next, the method 70 proceeds to a decision block 76 where a determination is made as to whether sufficient power is available to the media player 10 for playing the desired movie segment as initially requested (e.g., using the initial video settings). Accordingly, the media player 10 compares the amount of power needed to satisfy the requirements determined at block 74 to the total power available to the power supply 32 of the media player 10. If sufficient power is available for satisfying the above power requirements, the method 70 proceeds to block 78 where the media player 10 plays the desired video segment for the specified amount of time, based on the video settings initially configured.

However, if it is determined that the media player 10 has insufficient power for playing the requested video segment using the initial video settings, the method 70 then proceeds to block 80. Accordingly, at block 80 the media player 10 automatically adjusts the initial configuration video settings in a manner similar to that discussed above with reference to FIG. 2. For instance, one or more of the video settings may be adjusted in accordance with respective ranking attributes and a minimum playback levels. Hence, to satisfy the desired viewing time, the media player 10 may adjust one or more video settings in order to reduce the overall power consumed by the collective components of the media player, thus, prolonging the lifetime of the media player's battery. By way of example, these adjustments may include adjusting one or more of the viewing resolution, video bit-rates, backlighting intensity levels, sound volume levels, equalizer settings and so forth, as discussed above with reference it FIG. 2. Such adjustments may be continuously implemented until the power level which the media player 10 is expected to consume in playing the entire video segment for the duration is less or otherwise matches the power available to the media player. It should be appreciated that the aforementioned adjustments of the video settings are performed in a manner maintaining acceptable viewing quality levels (e.g., in accordance with the minimum playback levels).

Further, if, for example, during the playing of the video segment, the user wishes to change any of the aforementioned video settings, such as increasing resolution, volume etc., the method 70 is adapted to reassess the power requirements in light of the changes. In doing so, the method 70 proceeds from the block 78 to a decision block 82 to determine whether any changes in the previously selected or adjusted video settings occurred during the playing of the video segment. If no changes have occurred, the method 70 returns to the block 78 and the video segment continues to play in accordance with the initially selected or adjusted settings. If, however, the user implements changes to the video settings during the playback of the video segment (e.g., increase volume or backlight intensity), the method 70 returns to the block 74. Accordingly, at the block 74, the method 70 reassesses the power requirements in light of the changes to determine if further adjustments to the video settings are needed in order to compensate for the aforesaid changes.

Figure 4:
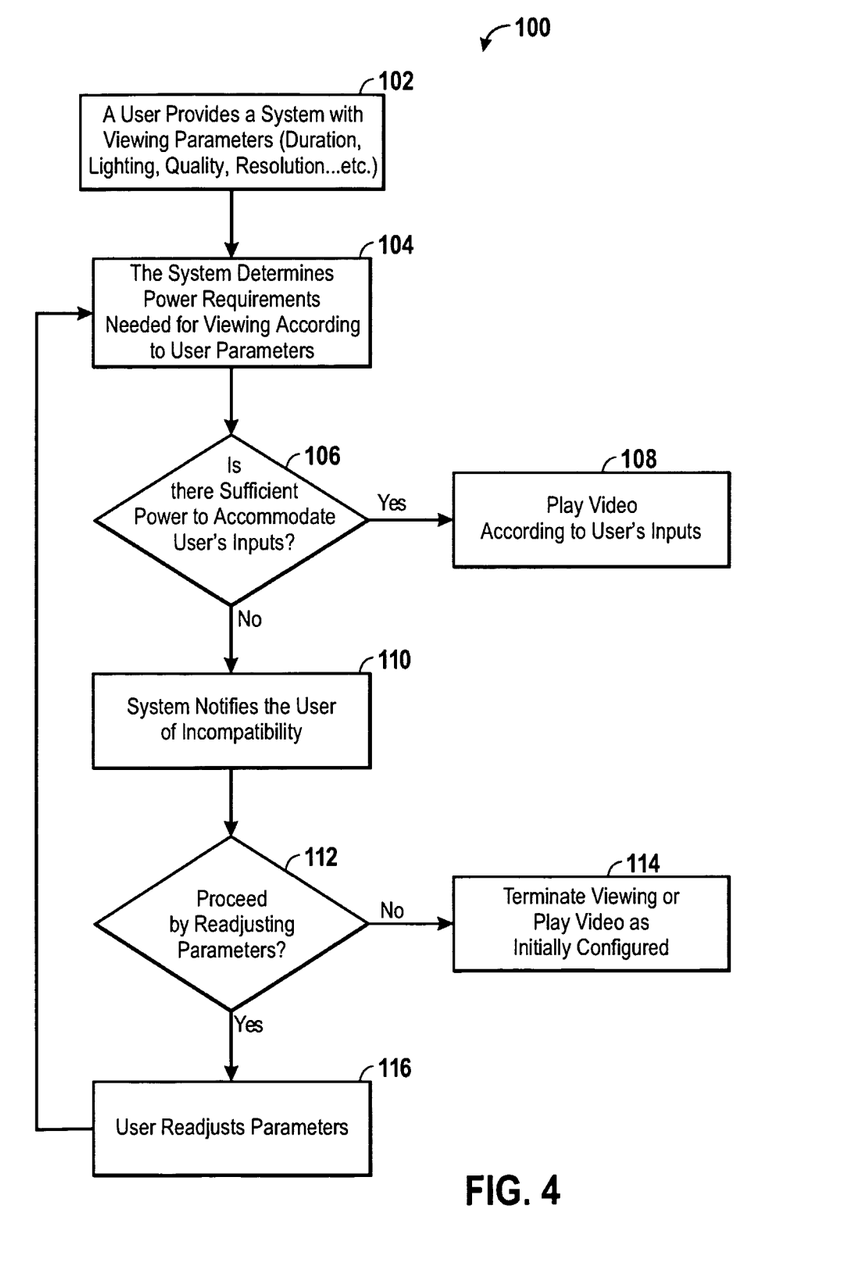
FIG. 4 is a flowchart illustrating an alternative method for operating the media player shown in FIGS. 1 and 2 in accordance with an embodiment of the present technique.

While an automatic adjustment scheme is discussed above, additional schemes may be implemented alone or in addition to the automated scheme to allow the user to participate in the power saving process. For instance, FIG. 4 depicts a flowchart illustrating an alternative method 100 for operating the media player 10 in accordance with an embodiment of the present technique. Accordingly, FIG. 4 illustrates a method 100 implemented by a user operating a media player, such as the device 10 (FIGS. 1 and 2). The method 100 provides a technique for the user and/or the media player 10 to manage power allocation among various components of the media player. In doing so, the method 100 enables the user to extend battery operating time of the media player 10 so that video segments can be played for durations initially desired by the user.

The method 100 begins at block 102, where the user configures one or more video settings for viewing a desired video segment. In doing so, the user, for example, may use input structures 16 (FIG. 1) to manually toggle between the various video configurations appearing on the display 14. For instance, the user may choose video segments or portions thereof for viewing. The user may similarly specify backlighting intensity levels for illuminating the display 14 during the viewing of the chosen video segment. Further, the user may specify display settings (e.g., video bit-rate, resolution, color) and sound settings (e.g., volume, equalizer, balance), for instance.

Thereafter, at block 104, the media player 10 determines an amount of power the media player 10 is expected to consume in playing the video segment in its entirety or for a specified duration using the above configuration provided by the user. From block 104, the method 100 proceeds to a decision block 106 for determining whether the media player 10 has sufficient power in for playing the selected video segment using the above settings. For instance, the media player 10 may compare levels of electrical power available to the device's batteries (e.g., power supply 32) with that required for operating the device as initially configured by the user. If the required power is equal or less than that available to the media player 10, then the method 100 proceeds to block 108, and the video segment is played in its entirety using the initial video settings configuration.

However, if it is determined at the decision block 106 that the media player has insufficient power to play the video segment as initially configured at block 102, then the method 100 proceeds to block 110. At block 110, the media player notifies the user of an incompatibility between the power available and the power required to play the chosen video segment. Such a notification may, for example, be in a form of an error notification message appearing on the display 14 or the like, as will be discussed below with reference to FIG. 5. In one exemplary embodiment, such a notification may indicate to the user remaining viewing time and may warn the user that the video segment may terminate prematurely. In other embodiments, the user may be notified that playing of the selected video segment cannot commence until further action is taken by the user (e.g., additional adjustment of video settings).

From block 110, the method 100 proceeds to decision block 112. At this point, the media player may await user input for readjusting the initially selected video configurations. As discussed above, the video settings may be further adjusted to lower the overall power the media player is expected to consume in playing back the video segment. If, however, the user decides to proceed without readjusting the video settings configurations or otherwise decides to terminate or cancel the viewing of the video segment, then the method 100 proceeds to block 114. In doing so, the media player may play a portion of the video segment (e.g., until the available power is depleted) or terminates the chosen video segment based on the user's instructions.

Returning to decision block 112, if the user decides to proceed by readjusting the video settings configurations of the media player, then the method 100 proceeds to block 116. In doing so, the media player 10 may prompt the user to readjust various video settings, such as those associated with the display and sound systems (e.g., 34 and 36) of the media player. This step may be contingent on a response from the user to a query, which may be in form of a pop-up message appearing the display 14 of the device 10. Further, as discussed with reference to FIG. 2 above, such a message may indicate to the user the time required to play the video segment in entirety, as well as the time available for playing the segment given the amount energy stored in the power supply 32 of the media player 10. Hence, the user may be directed through various screens for readjusting the video settings in order to match the required power with the total power available to the media player. For instance, the user may readjust the display resolution level, the sound volume level, and/or the display backlight intensity level, or video bit-rate etc., or alternatively, the user may choose to shorten the playback duration of the video segment while maintaining the aforementioned initial configurations. Accordingly, such readjustments are adapted to lower the consumption of power, thereby extending the battery lifetime of the media player 10. In view of the readjusted settings, the media player 10 may reevaluate the power available for playing the video segment and notify the user if the time required to play the entire segment (e.g., 45 minutes) matches or is less than the time available to the media player 10.

Next, the method 100 returns to block 104, where the media player 10 reevaluates the power required by the media player to play the selected video segment in view of the adjustments made at block 116. As explained above, the user may go through multiple iterations of adjusting the video settings before the amount of playing time available to the media player 10 matches the required time for playing the segment in entirety. Thus, from block 104, the method 100 recurs in a manner similar to that described above.

Figure 5:
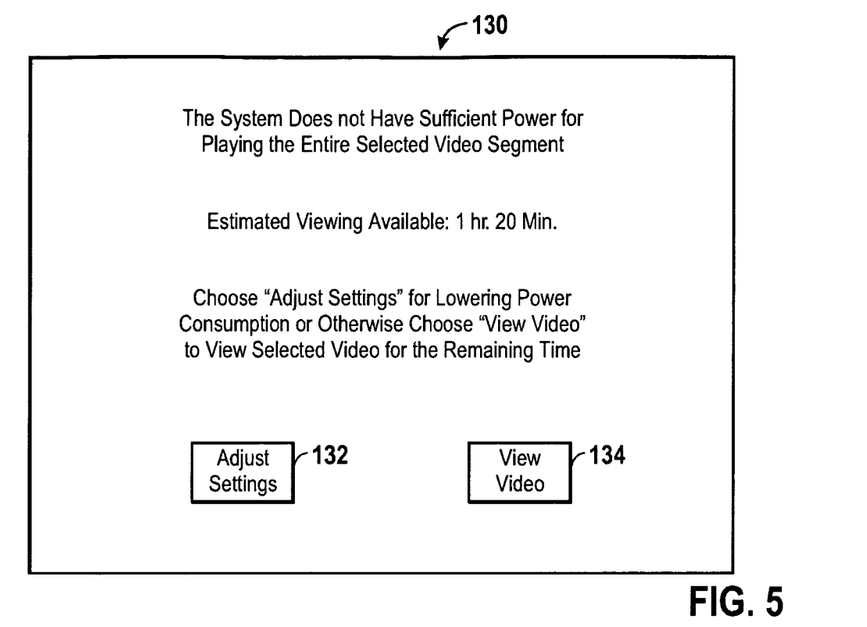
FIG. 5 depicts a message notifying a user when there is insufficient power to play back a video segment in accordance with an embodiment of the present technique.

FIG. 5 depicts a notification message 130 that may be provided to a user on the display 14 when the device 10 lacks sufficient power to play back a video segment in accordance with an embodiment of the present technique. Accordingly, a display, such as the display 14 of the device 10 displays a message 130 adapted to inform the user regarding the incompatibility between power available to the device and the power required for playing the video segment using a requested video settings configuration. Accordingly, the message 130 may correspond to one of the notifications produced by the media player at block 110 of the method 100, as discussed herein with reference to FIG. 4. The message 130 is further adapted to prompt the user to adjust the above-mentioned video configurations for lowering the overall power consumed by the media player when such incompatibilities arise.

As illustrated, the screen 130 contains several written notifications in the form of user-selectable options 132 and 134. In one embodiment, the display 14 may include a touch screen interface, and the options 132 and 134 may represent virtual buttons which may be pressed by a user by physically touching the location of the virtual buttons on the display 14. The first notification appearing on the screen 130 indicates to the user that the media player has insufficient power for playing a selected video segment in full. In response to this, the user may choose the option 132, labeled "ADJUST SETTINGS." In doing so, the user may be guided through various screens for configuring the device 10 to reduce power consumption during operation, as discussed above with reference to FIGS. 2-4. For example, such adjustments may correspond to those made at block 116 of method 100 (FIG. 4), and may include changing the video settings (e.g., resolution, bit-rates, backlight, sound etc.) in order to lower the overall power consumption. Alternatively, the user may choose the option 134, labeled "VIEW VIDEO," prompting the media player to play the video segment, as initially desired.

Figure 6:
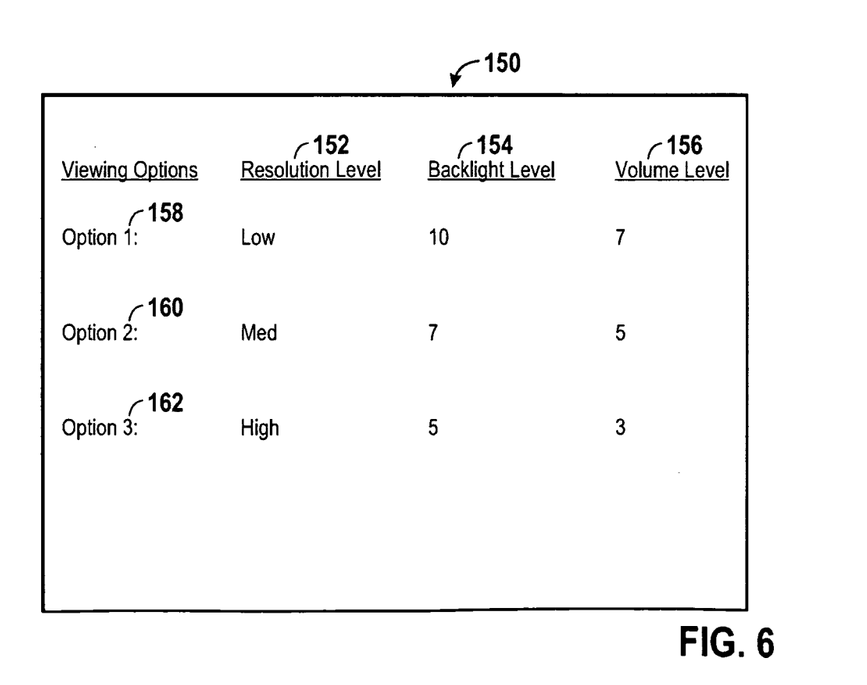
FIG. 6 depicts a message that provides a user with one or more alternate video settings configurations for playing a video segment when the power required by a current video settings configuration exceeds the total available power in accordance with an embodiment of the present technique.

FIG. 6 depicts another notification message 150 that provides a user with one or more alternate video settings configurations for playing a video segment when the power required by a current video settings configuration exceeds the total power available to a media player in accordance with an embodiment of the present technique. The message 150 is adapted to display several alternate video settings configurations from which the user of the media player (e.g., the device 10) may select to view a desired video segment. Accordingly, such options include combinations of video settings permitting the media player to efficiently utilize power stored within its batteries for playing an entire video segment at acceptable viewing qualities.

Accordingly, the message 150 includes a resolution level indicator 152, a backlight level indicator 154 and a volume level indicator 156. The message 150 further includes viewing options 1, 2 and 3 labeled by reference numerals 158, 160 and 162, respectively. As illustrated, for instance, the first viewing option 158 includes a resolution level set to "LOW," a backlight level set to a magnitude of 10 (full) and a volume level set to a magnitude of 5 (out of 10). Hence, the option 158 may be desirable for playing video segments, such music videos, where sound quality is more desirable than picture quality. By further example, the third option 162 may offer a picture resolution level of "HIGH" at the expense of sound or backlight levels, which are set to magnitudes 5 and 3, respectively, as illustrated. Hence, such an option may be suitable for users who wish to use their media player for viewing video segments where the picture is more important, such as in a movie or film, for instance. Further, the reduced sound levels may be desirable in situations where a user wishes not to disturb their surroundings as may typically occur on airplanes, trains, and so forth. It should be appreciated that the message 150 may include additional viewing options having more selection variety and including additional video setting levels, such as those associated with the display and sound systems 34 and 36.

As will be appreciated by those skilled in the art, the intelligent power management techniques described herein may be implemented using hardware, software, or a combination thereof. For instance, in certain embodiments, the intelligent power manager may be implemented as a computer program including executable code stored on one or more tangible computer readable medium.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for operating a media player, comprising:
   receiving at a processor a set of initial video settings, wherein the initial video settings comprise operational characteristics of the media player set by a user prior to playing a video segment, and wherein each of the initial video settings includes a ranking attribute;
   determining via the processor an amount of power required to play the video segment for a desired playback duration using the initial video settings;
   determining an amount of total power available to the media player; automatically adjusting one or more of the initial video settings if the required power exceeds the total power available to the media player, wherein doing so comprises:
   (a) automatically adjusting an initial video setting having a lowest ranking attribute;
   (b) determining an amount of power required to play the video segment for the desired playback duration using the adjusted video settings;
   (c) if the amount of power required to play the video segment for the desired playback duration using the adjusted video settings still exceeds the total power available to the media player, adjusting an initial video setting having a next lowest ranking attribute; and
   (d) repeating steps (b) and (c) until it is either determined that the total power available to the media player is sufficient to play the video segment for the desired playback duration using the adjusted video settings or until each of the initial video settings is adjusted; and
   playing the video segment via the media player if the required power is equal to or less than the total power available to the media player.

2. The method of claim 1, wherein each of the initial video settings includes a minimum playback threshold, and wherein automatically adjusting each of the initial video settings includes not adjusting each initial video settings below its respective minimum playback threshold.

3. The method of claim 1, further comprising, if after adjusting each of the initial video settings the required power still exceeds the total power available to the media player, providing a notification that the video segment cannot be played for the desired playback duration using either the initial video settings or the adjusted video settings.

4. The method of claim 1, wherein the desired playback duration is the length of the duration of the entire video segment.

5. The method of claim 1, wherein the desired playback duration is specified by a user to be less than the duration of the entire video segment.

6. The method of claim 1, wherein the video segment comprises scalable video data, and wherein automatically adjusting one or more of the initial video settings includes reducing a video bit-rate at which the scalable video data is decoded.

7. The method of claim 1, wherein the initial video settings includes at least one of a viewing time setting, display settings, or sound settings.

8. The method of claim 3, further comprising prompting the user to further adjust one or more of the initial video settings manually so that the video segment may be played for the desired playback duration.

9. The method of claim 3, comprising offering one or more alternate video settings configurations and prompting the user to select one of the alternate video settings configurations, wherein each of the alternate video settings configurations provides for the playback of the video segment for the desired playback duration.

10. The method of claim 7, wherein the display settings comprise at least one of a video resolution control, display backlight control, or color enhancement control.

11. The method of claim 7, wherein the sound settings comprise at least one of a volume control, balance control, or equalizer control.

12. A method for operating a media player, comprising:
   determining via a processor an amount of power required to play a video segment for a desired playback duration using a set of initial video settings, wherein the initial video settings comprise operational characteristics of the media player set by a user prior to playing the video segment, and wherein each of the initial video settings includes a ranking attribute;
   determining via the processor an amount of total power available to the media player;
   if the required power is greater than the total power, automatically adjusting via the processor one or more of the initial video settings to reduce the required power for playing the video segment for the desired playback duration:

wherein doing so comprises:

(a) automatically adjusting an initial video setting having a lowest ranking attribute;

(b) determining an amount of power required to play the video segment for the desired playback duration using the adjusted video settings;

(c) if the amount of power required to play the video segment for the desired playback duration using the adjusted video settings still exceeds the total power available to the media player, adjusting an initial video setting having a next lowest ranking attribute; and (d) repeating steps (b) and (c) until it is either determined that the total power available to the media player is sufficient to play the video segment for the desired playback duration using the adjusted video settings or until each of the initial video settings is adjusted; and playing the video segment via the media player using the adjusted video settings if the required power is equal to or less than the total power available to the media player.

13. The method claim 12, further comprising recalculating the power required to play a video segment for the desired playback duration when a user manually readjusts one or more of the adjusted video settings during playback of the video segment.

14. The method of claim 12, wherein the media player is a mobile device.

15. The method of claim 13, further comprising, if the recalculated required power exceeds the total power, automatically readjusting the adjusted video settings to reduce the recalculated required power for playing the video segment for the desired playback duration.

16. The method of claim 13, wherein manually readjusting the adjusted video settings by the user includes at least one of changing a display setting or a sound setting.

17. The method of claim 13, wherein the video segment comprises scalable video data, and wherein manually readjusting the adjusted video settings by the user includes changing a bit-rate at which the scalable video data is decoded.

18. The method of claim 15, wherein automatically readjusting the adjusted video settings comprises not readjusting the one or more video settings manually readjusted by the user.

19. A media player adapted to play a video segment requested by a user, comprising:

a processor;

a power supply operably coupled to the processor, wherein the power supply is configured to store power for playing the requested video segment; and a sound system and a display system operably coupled to the processor, wherein the sound system and the display system are adapted to consume power for playing the requested video segment;

wherein the processor is adapted to determine a total power available from the power supply, determine the power required to play the video segment for a desired playback duration using a set of initial video settings, automatically adjust one or more of the initial video settings if the required power exceeds the total power available to the media player, and play the video segment for the desired playback duration if the required power is less than or equal to the total power stored in the power supply, wherein the initial video settings comprise operational characteristics of the media player set by a user prior to playing the video segment;

wherein each of the initial video settings includes a ranking attribute;

wherein automatically adjusting one or more of the initial video settings comprises:

(a) automatically adjusting an initial video setting having a lowest ranking attribute;

(b) determining an amount of power required to play the video segment for the desired playback duration using the adjusted video settings;

(c) if the amount of power required to play the video segment for the desired playback duration using the adjusted video settings still exceeds the total power available to the media player, adjusting an initial video setting having a next lowest ranking attribute; and (d) repeating steps (b) and (c) until it is either determined that the total power available to the media player is sufficient to play the video segment for the desired playback duration using the adjusted video settings or until each of the initial video settings is adjusted.

20. The media player of claim 19, wherein the video segment comprises scalable video data, and wherein the processor is adapted to decode the scalable video data.

21. The media player of claim 19, wherein the sound system comprises at least one of a volume control, a balance control, or an equalizer control, and wherein the display system comprises at least one of a video resolution control, a display backlight control, or a color enhancement control.

22. The media player of claim 20, wherein automatically adjusting one or more of the initial video settings comprises changing a bit-rate at which the scalable video data is decoded by the processor.

23. A tangible machine readable medium storing a set of instructions, the instructions comprising:

code configured to determine an amount of power required to play a video segment for a desired playback duration on a media player using a set of initial video settings, wherein each of the initial video settings includes a ranking attribute;

code configured to determine an amount of total power available to the media player, wherein the initial video settings comprise operational characteristics of the media player set by a user prior to playing the video segment;

code configured to determine an amount of total power available to the media;

code configured to automatically adjust one or more of the initial video settings if the required power exceeds the total power available to the media player, wherein automatically adjusting one or more of the initial video settings comprises:

(a) automatically adjusting an initial video setting having a lowest ranking attribute;

(b) determining an amount of power required to play the video segment for the desired playback duration using the adjusted video settings;

(c) if the amount of power required to play the video segment for the desired playback duration using the adjusted video settings still exceeds the total power available to the media player, adjusting an initial video setting having a next lowest ranking attribute; and (d) repeating steps (b) and (c) until it is either determined that the total power available to the media player is sufficient to play the video segment for the desired playback duration using the adjusted video settings or until each of the initial video settings is adjusted; and code configured to play the video segment if the required power is equal to or less than the total power available to the media player.

* * * * *